F. J. B. CORDEIRO.
ELECTRIC MOTOR AND DYNAMO.
APPLICATION FILED MAR. 6, 1911.

1,019,709.

Patented Mar. 5, 1912.

2 SHEETS—SHEET 1.

WITNESSES

INVENTOR
Frederick J. B. Cordeiro
Attorney

F. J. B. CORDEIRO.
ELECTRIC MOTOR AND DYNAMO.
APPLICATION FILED MAR. 6, 1911.

1,019,709.

Patented Mar. 5, 1912.
2 SHEETS—SHEET 2.

WITNESSES
Fenton S. Belt
J. W. Sherwood

INVENTOR
Frederick J. B. Cordeiro
By Franklin N. Hough
Attorney

UNITED STATES PATENT OFFICE.

FREDERICK J. B. CORDEIRO, OF THE UNITED STATES NAVY.

ELECTRIC MOTOR AND DYNAMO.

1,019,709.  Specification of Letters Patent.  Patented Mar. 5, 1912.

Application filed March 6, 1911. Serial No. 612,719.

*To all whom it may concern:*

Be it known that I, FREDERICK J. B. CORDEIRO, a citizen of the United States, and an officer of the United States Navy, (whose post-office address is care of Navy Department, Washington, District of Columbia,) have invented a new and useful Electric Motor and Dynamo, of which the following is a specification.

This invention relates to certain new and useful improvements in electric motors and dynamos, and relates more particularly to the combination electric motor and dynamo, and it has for its object, to produce a dynamo electric machine of either a constant or alternate current type.

Further objects and advantages of the invention will appear in the following specification and will be clearly illustrated in the accompanying drawings which form a part thereof.

Figure 1:
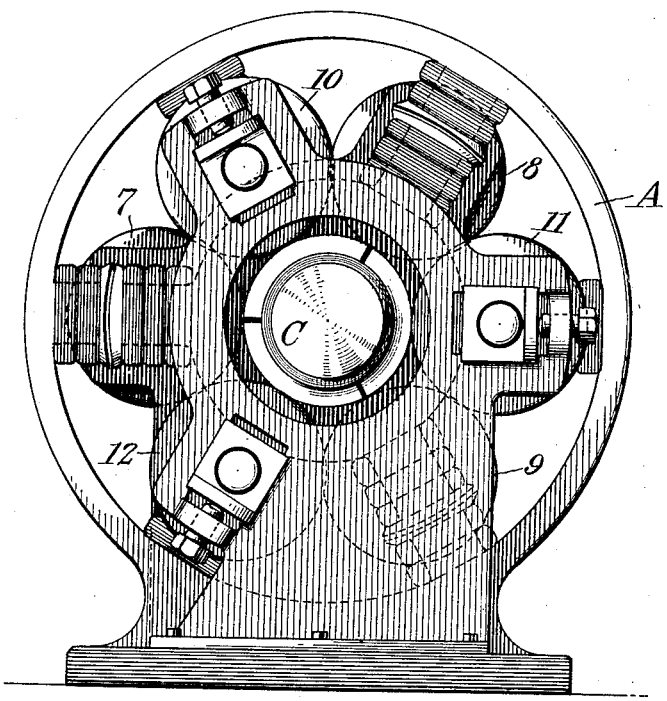
Figure 2:
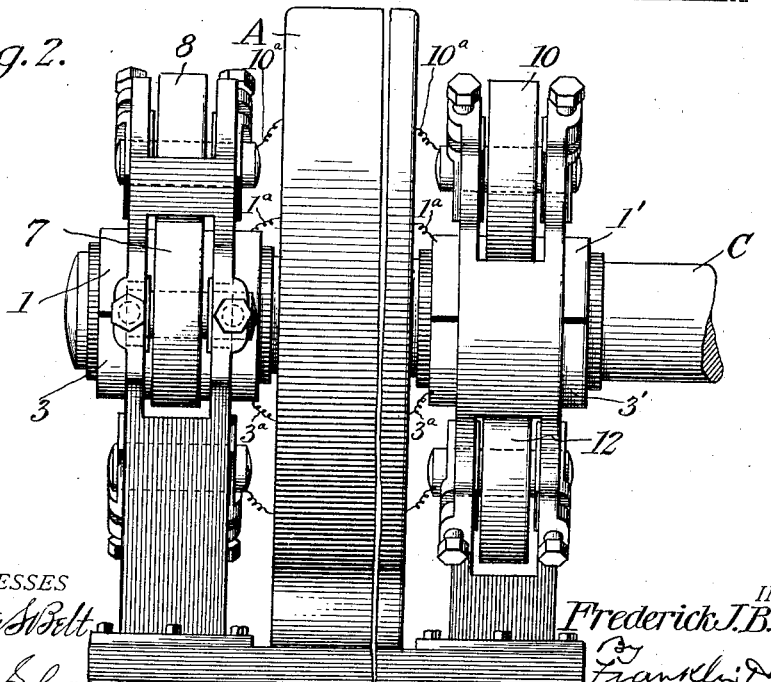
Figure 3:
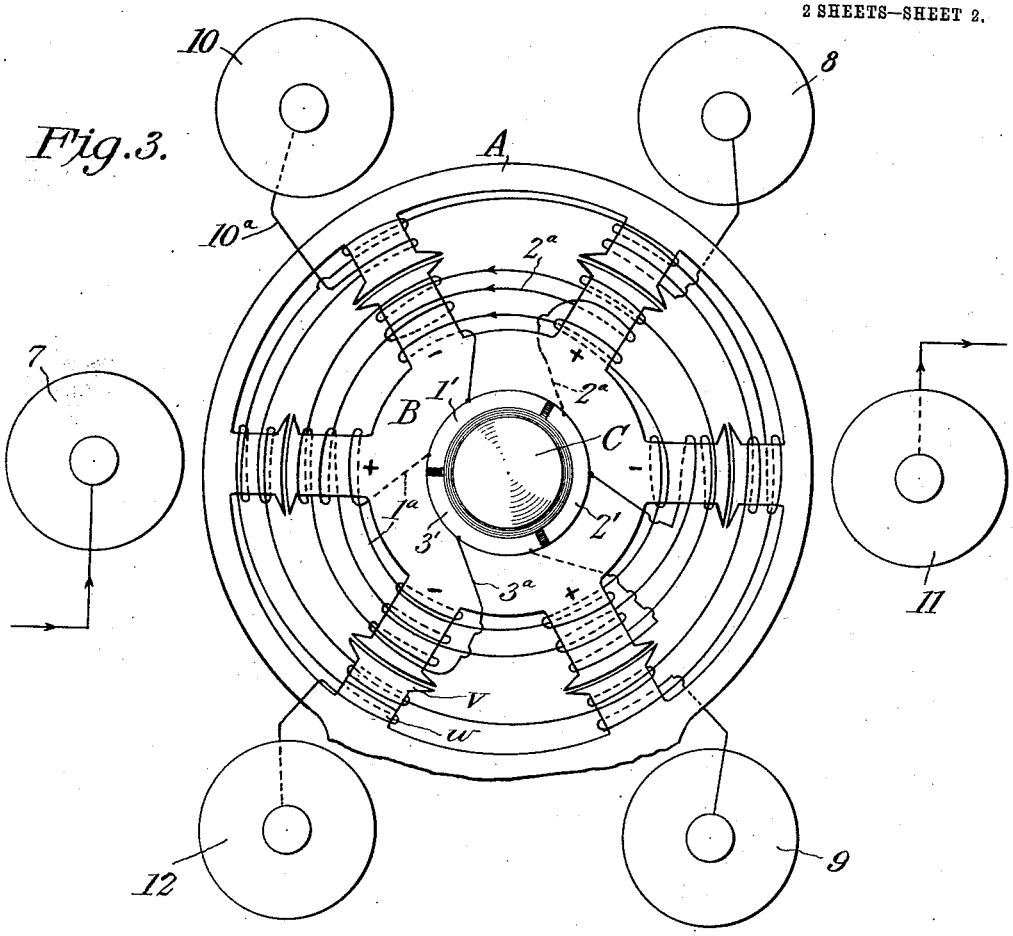
Figure 4:
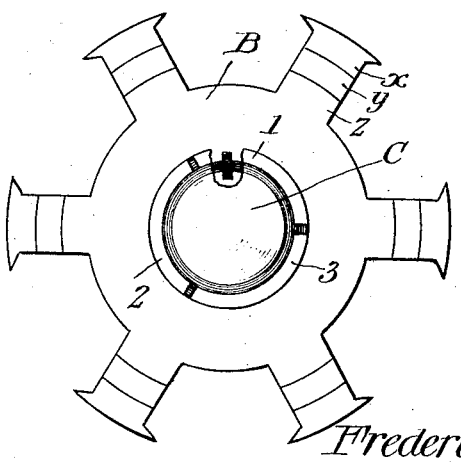

The invention is clearly illustrated in the accompanying drawings, which with the numerals of reference marked thereon, form a part of this specification, and in which drawings, Figure 1 is a side elevation of my invention, Fig. 2 is an end view thereof, Fig. 3 is a diagrammatic view, and Fig. 4 is a side view of the rotor.

The invention consists essentially of a ring or field A of soft iron (called in this specification a stator) from the inner surface of which project 6 poles equi-distant from each other, or 60° apart.

Within the stator, revolves the rotor B, which consists of a ring of soft iron which is supported upon an axle C, and which has six poles, equi-distant from each other, projecting from its outer surface. The free end surfaces of the poles are curved so that as the rotor revolves, they clear the poles of the field A by the smallest possible air gap. The axle C, if of steel, is separated from the soft iron rotor by a ring of some non-magnetic substance, such as brass, and is rigidly attached to the rotor. Attached to the axle, on each side of the rotor, is a commutator ring, and each ring is split into three parts or segments of 120°, and each one of these six segments is insulated from the axle and from the adjacent segments. Further these segments are so attached to the axle that the insulating line between any two of them, on both sides of the rotor, falls exactly opposite the center of the same poles of the rotor. In the diagram the numbers 1, 2, 3, represent these segments.

The rotor is supported by having its axle which is horizontal, rest through the commutators, upon three wheels on each side. These wheels are 120° apart on each side, and the two series of wheels are alternately positioned relative to one another. In order to keep the diagram clear these wheels have been moved radially outward: in reality they touch the circumference of the commutator rings at points 120° apart as shown in Fig. 1, the three wheels 7, 8 and 9 being on one side of the rotor, while the three wheels 10, 11 and 12, are on the other side. All the wheels are insulated from their supporting bearings, and can be used as electrodes, while at the same time, they act as roller bearings, and diminish the friction of the axle in its rotation. The windings of the stator and rotor are shown in the diagram, the visible halves of the turns of wire around the poles being indicated by full lines, the invisible parts by dotted lines.

One end of a wire $1^a$ is soldered to the left commutator segment 1, and is then wound about the poles of the rotor, close to the hub, passing from one pole to another in clockwise direction until finally its end is soldered to the right commutator segment $1'$. In a similar manner the left commutator segment 2 is connected with the right commutator segment $2'$, the wire $2^a$ passing around the six poles of the rotor as indicated in the diagram. Lastly the wire $3^a$ passes from the left commutator segment 3, around the six poles of the rotor, to the right commutator segment $3'$. Thus each pole of the rotor is surrounded by three independent circuits which are wound in separate compartments $x$, $y$ and $z$. Further all these circuits pass in the same direction about each pole, but alternate poles are wound in alternate directions. It is thus evident that, if currents pass through these coils always in the direction from left to right commutator segments, three poles 120° apart, will always be positive, while the three poles between will always be negative, and these poles will always preserve the same polarity in all positions of the rotor.

The stator is wound as follows: Each pole of the stator is divided into two compartments $v$ and $w$, indicated in the diagram. To the axle of the wheel 10, one end of the wire 10ª is soldered. The wire then passes around the compartment $v$ of the six poles of the stator as indicated in the diagram, passing in a counter-clockwise direction around to the axle of the wheel 8. These coils are wound in the compartments nearer to the center. Likewise the bearings of the wheel 12 are connected with the bearings of the wheel 9 by a wire which makes the circuit of the six poles in a clockwise direction, the coils lying in the outer compartments W, of the poles. It is evident from the winding, as indicated in the diagram that when a current passes from 10 to 8, the poles of the stator will be alternately positive and negative, while when the current passes from 12 to 9, the polarity of every pole will be reversed.

In using the machine as a motor, it is evident, from a consideration of the windings as given in the diagram, that by using 7 and 11 as electrodes, for our current supply, it is indifferent which one is taken as the anode or cathode. In either case the rotor will rotate in a clockwise direction. Furthermore the motor would be self-starting unless it happened to be exactly at the dead point depicted in the diagram. In such a case it would be necessary to move the rotor slightly out of this dead position to start it. Since the direction of the current is immaterial, the motor in any case moving always in a clockwise direction, it will be seen that constant or alternating currents can be used indifferently. Thus one and the same machine can be used as a highly efficient constant-current motor, or as an equally efficient alternating-current motor.

To use the machine as a dynamo, or current generator, it is necessary to apply a weak current from some external source. If we send a weak current from 7 to 11, then the motor will begin to rotate slowly in a clockwise direction. If now by means of power, we rotate the motor in counter-clockwise direction, a strong current will be generated in the same direction, as the original exciting current, viz, 7 to 11. If our weak current had been in the direction from 11 to 7, the rotor would as before rotate slowly in a clockwise direction; but if we now suddenly apply power and rotate it in a counter-clockwise direction, then a strong current is immediately generated, and as before, in the direction of the exciting current, i. e., from 11 to 7. Thus, by first exciting and starting our motor in a clockwise direction, if we suddenly apply power and reverse the rotation, we shall generate a constant current, and the direction of this current is determined by the direction of the original exciting current. It is not possible to generate alternating currents by such a construction.

It will be seen that of the two independent circuits, in the stator, one of these circuits is always idle, while the other is always active, one alternating with the other. Of the three independent circuits in the rotor, one of these circuits is always idle, while the other two are always active, any one circuit being in regular rotation, idle for one third of the time, and active for two thirds of the time. A strong continuous torque is thus exercised on all the poles at all times, except at the instant that they are passing the dead points. The efficiency of the machine is therefore very high.

For the purpose of this specification, I have used a six-pole machine, a very useful type. By similar principles, it is possible to construct two-pole, four-pole, or any even-numbered-pole machines, but I consider that the descriptions of these special constructions and windings would make this specification too long, and be irrelevant. I have therefore chosen the six-pole machine as a type of this novel construction.

After having thus described the construction and winding of my invention, I shall now describe more at length, its action.

Let us suppose that the poles of the rotor instead of being in the position given in the diagram, have been moved back (counter-clockwise) half way to the next poles. We now allow a current to flow from 7 to 11. From the circumference of the wheel 7, the current passes to the left commutator segment 1. It then passes around the six poles of the rotor by the inner coils and emerges at the right commutator segment 1', the polarity of the poles of the rotor being that indicated by the signs $+$ and $-$ in the diagram. It then passes to the circumference of the wheel 10 and through its bearings to the inner circuit of the stator. The pole of the stator opposite 10, becomes negative, while the other poles are alternately positive, and negative. The current then passes from the circumference of the wheel 8, through the left commutator segment 2, to the middle coils of the rotor, thus increasing their previous polarity. It then passes out at 11. The poles of the rotor are thus strongly urged to the position given in the diagram. On passing the dead point by its inertia, the current is immediately switched into the outer coils of the stator and all the poles of the stator have their polarity immediately reversed. The polarity of the poles of the rotor, however never changes. Hence the poles of the rotor are repelled from the poles they have just passed and attracted by the poles ahead. Every time the poles of the rotor pass the poles of the stator the polarity of the latter is reversed. Hence, without a load, the rotor will be rapidly accelerated into a very high speed, the limit of which is only reached when the induced counter-electromotive force is equal to that of the driving current. Up to this point the current will decrease and when the limiting speed is reached no current will pass.

Having thus described my invention what I claim as new and desire to secure by Letters Patent is:—

A dynamo electric machine, comprising a stator and rotor, each having an even number of poles, wound with more than one circuit, equi-distant wheels forming electrodes, commutator segments on the axle of the rotor, bearing upon an equal number of said equi-distant wheels, opposite the poles of the stator, the said wheels serving as roller bearings for the shafts, and as electrodes permitting the successive automatic combination of the various circuits, to produce a continuous torque in one direction, upon the poles of the rotor, substantially as described and for the purpose specified.

FREDERICK J. B. CORDEIRO.

Witnesses:
RUDOLPH FRICKE,
ALBERT R. MORAWETZ.

Copies of this patent may be obtained for five cents each, by addressing the "Commissioner of Patents, Washington, D. C."